G. S. MORISON.
AUTOMATICALLY ADJUSTING SPEED OR REVOLUTION CHANGE GEAR.
APPLICATION FILED NOV. 23, 1918.

1,291,654. Patented Jan. 14, 1919.

Inventor.
G. S. Morrison.
By H. R. Kerslake
Atty.

UNITED STATES PATENT OFFICE.

GEORGE SMITH MORISON, OF MELBOURNE, VICTORIA, AUSTRALIA.

AUTOMATICALLY-ADJUSTING SPEED OR REVOLUTION CHANGE GEAR.

1,291,654.  Specification of Letters Patent.  Patented Jan. 14, 1919.

Application filed November 23, 1918. Serial No. 263,915.

*To all whom it may concern:*

Be it known that I, GEORGE SMITH MORISON, a subject of the King of Great Britain, residing at Collins House, 360 Collins street, Melbourne, in the State of Victoria, Australia, have invented certain new and useful Improvements in Automatically-Adjusting Speed or Revolution Change Gear; and I do declare the following to be a full, clear, and exact description of the invention, such as will enable others skilled in the art to which it appertains to make and use the same.

This invention relates to a device for reducing or increasing the speed, or number of revolutions, of any revolving portion of a machine or gearing, such as any pulley, shafting, reel, drum, machine, or any portion of a machine, which is being driven through the agency of a higher or lower speed prime mover or shafting.

For the purpose of explanation I have shown in this specification and accompanying drawings one form of application of my invention to achieve the increase or decrease of speed for general purposes, but I would have it understood that the matter therein shown may be applied, in modified forms, to suit varying requirements without departing from the nature of my invention.

In order that my invention may be the more easily understood reference may be made to the accompanying drawings in which—

Fig. 8 shows the outer ring or rim in section showing the annular track or groove in which the rollers or wheels operate while

In these drawings $a$ is a central collar, roller, pulley or boss, fixed on or forming part of the high-speed or driving shaft $a'$ of the prime mover. Around this central collar $a$ on the shaft $a'$ are placed three or more circular rollers, disks, or pulleys $b$, situated at approximately equal distances from each other or in any predetermined position. Each roller $b$ revolves on its own axis or central pin, and is in contact with, and rolls between, the central collar $a$ on shaft and an outer ring or rim $c$ that encircles the rollers $b$. One or more or all the rollers $b$ may be fitted in suitable fixed or adjustable bearings as at $b'$, or linked together as may be determined, by links $d$.

Figure 1:
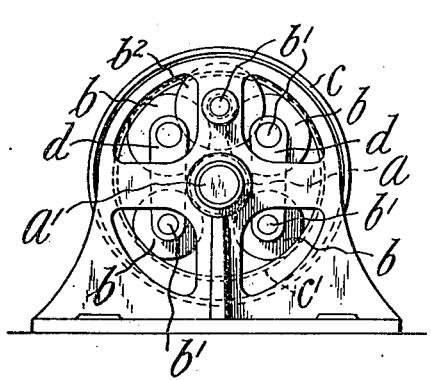
Figure 1 is a front elevation of apparatus embodying my invention.
Figure 2:
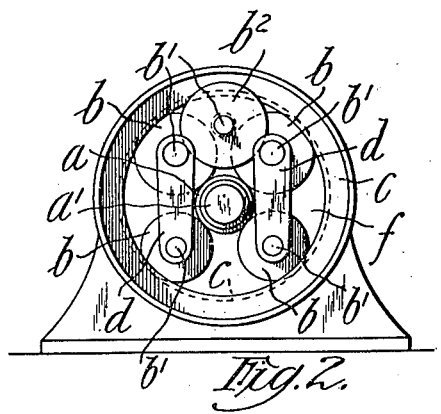
Fig. 2 is a similar view, but with the front standard frame or casing removed.
Figure 3:
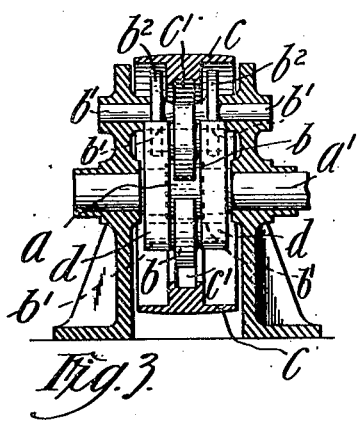
Fig. 3 is a side elevation parts of which are in section.
Figure 4:
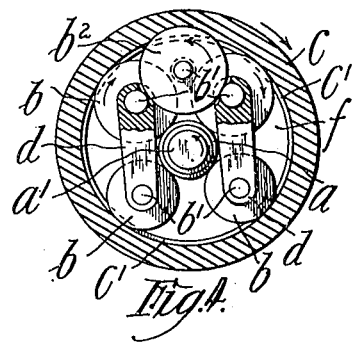
Fig. 4 is a cross section showing the position of rollers and links during certain functions of the gear as will be hereinafter explained.
Figure 5:
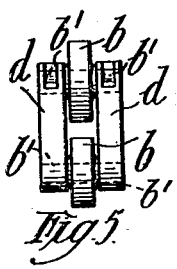
Fig. 5 shows a side view of the links with the upper and lower rollers or wheels respectively in place.
Figure 6:
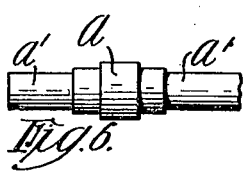
Fig. 6 is a detail showing the central shaft with collars thereon.
Figure 7:
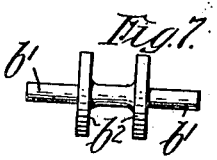
Fig. 7 is also a detail showing the top rollers and spindle thereof.
Figure 8:
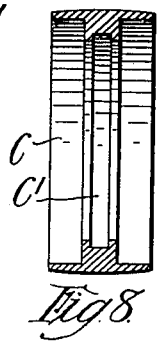
Figure 9:
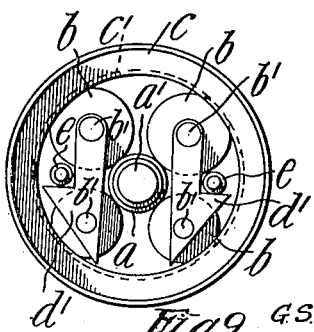
Fig. 9 illustrates how the links hereinafter to be referred to may be constructed to operate with the rollers in a slightly different position.

The links $d$ are automatically adjustable in accordance with the pull of the central collar $a$ by running top rollers $b^2$ or I may, however, employ in lieu of the top rollers $b^2$ two fixed lateral rollers $e$ acting as limitation stoppers against undue distance between the said links $d$ (see Fig. 9).

The rollers $b$ are placed in the annular space $f$ between the collar $a$ on the high speed shaft $a'$ and the inside face $c'$ of the outer ring $c$, and are differential in size, reducing or varying in diameters in a fixed or predetermined ratio from the diameter of the larger top roller $b^2$ to that of the smallest or bottom rollers $b$ in the train. This has the effect of placing the geometrical center of the outer ring $c$ eccentric to that of the central or high speed shaft $a$ the amount of eccentricity of the centers being determined by the difference in diameters of the rollers and their positions when placed in the annular space between the shaft $a$ and outer ring $c$.

The fixed collar $a$ on shaft $a'$, also the rollers $b$, and the inside face $c'$ of ring $c$ are all turned true circles with true parallel faces, but same may be all turned with circular grooved faces, the convex faces of each part to fit into the concave grooved faces of the other part and thereby securing increased gripping contact.

The speed or number of revolutions of the outer ring $c$ will be proportionately lower than that of the central or high speed driving shaft $a'$ according to the ratio of the diameter of the inside of the ring $c$ to that of the fixed collar $a$ on the shaft $a'$, and the diameters of the rollers $b$, and $b^2$ these diameter ratios to be predetermined for a given speed reduction.

The rollers $b$ and $b^2$ may be stepped, or turned with two diameters, so that the larger diameter of each roller would be in contact with, and revolve on, the central collar $a$ on the shaft $a'$, and the smaller diameter of each roller would be in contact with and carry or support the outside ring $c$, thus causing a two-speed-change or a second reduction of speed or revolutions and consequently much greater reduction in revolutions of the outer ring $c$.

The outside ring $c$ at its comparatively lower speed may be used in its position on the high speed shaft either as a pulley for belt driving other machinery, or used for coupling to and driving another length of shafting at the reduced speed, or with teeth cut on outside of ring $c$ may be used to mesh with or drive other gearing.

In operation, the rollers $b$ being placed in an eccentric annular space $f$ between the driving shaft $a'$ and the outside ring $c$, have a tendency to wedge themselves tight, in rolling toward the narrowest or lower part of the said annular space $f$, and are therefore in continual contact with both the collar $a$ on the shaft $a'$ and the inside face $c'$ of outer ring $c$.

The largest roller or rollers $b^2$ being placed approximately in the top part of this annular space $f$ between top side of shaft $a'$ and ring $c$, leaves a smaller space at the bottom between underneath side of shaft $a'$ and bottom of ring $c$, this reduction in the space being gradual from the position of the largest or top roller $b^2$ at its points of contact with collar $a$ on shaft and outer ring $c$ and continuing in its convergence to the other or lower side of annular space $f$, diametrically opposite.

The rollers $b$ therefore, according to their diameters take up their respective positions in the space $f$ allowed by the decreasing or converging environment, all rollers being thus in continual contact at all times with both the shaft at $a'$ and the inside face $c'$ of outer ring $c$ and exerting a pressure on both the shaft and the ring proportionate to the load or work demanded on the outer ring or pulley $c$. The shaft $a'$ during work is therefore in compression, and the outer ring $c$ in tension.

Should wear take place on either the collar $a$ on shaft $a'$, or on the rollers $b$ or $b^2$, or on inside face of outer ring $c$, the rollers automatically take up a continuous gripping position further into the converging annular space $f$, all rolling faces being continuously in working contact and wearing to fit.

In the arrangement of the links as shown in Fig. 9 it will be seen that the top rollers $b^2$ are dispensed with and their function effected by the two limitation lateral rollers $e$, the links being suitably shaped as at $d'$ to engage with the said lateral rollers $e$. It is obvious that if the shaft $a'$ be driven at a high speed the ring $c$ will be reduced to a slow speed, or if the latter be the source of movement, by a belt or other connection to the motor, the spindle of $a'$ will be accelerated proportionately and thus the mechanism may be employed in general for either speed reduction or acceleration as may be desired for each local function.

Since there are no sliding surfaces, and all the contacts are on rolling surfaces, friction is at a minimum.

The operation may be reversed to produce high speed from low speed.

I claim:

1. In a change speed gearing, a rotatable shaft, a ring surrounding and eccentrically arranged relative to said shaft, rolling members arranged between and engaging said shaft and ring, and a rolling member having its axis arranged stationary relative to said shaft and bearing upon the axes of certain of the other rolling members.

2. A change speed gearing comprising a rotary shaft, a ring surrounding and eccentrically arranged relative to said shaft, a series of rolling members arranged between and engaging said shaft and ring, links connecting certain of said rolling members, and a rolling member having its axis arranged stationary relative to the shaft, said last named rolling member engaging the axes of certain of the other rolling members.

3. A change speed gearing comprising a rotary shaft having an enlargement, a ring surrounding said shaft and arranged eccentrically relatively to said shaft, a series of rolling members arranged between and engaging said shaft and ring, axles movable with certain of said rolling members, links connecting certain of said rolling members, and a rolling disk mounted between two of said rolling members and bearing upon said axles, said disk having its axis fixed relative to the axis of the shaft.

In testimony whereof I have signed my name to this specification in the presence of two subscribing witnesses.

GEORGE SMITH MORISON.

Witnesses:
 DUKIE WINDRIDGE,
 AUGUSTINE THOMAS MADDEN.